United States Patent
Kannan et al.

(10) Patent No.: US 11,252,159 B2
(45) Date of Patent: Feb. 15, 2022

(54) COGNITIVE ACCESS CONTROL POLICY MANAGEMENT IN A MULTI-CLUSTER CONTAINER ORCHESTRATION ENVIRONMENT

(71) Applicant: International Business Machines Corporation, Armonk, NY (US)

(72) Inventors: Priya Kannan, Bengaluru (IN); Shajeer K. Mohammed, Bengaluru (IN); Kavitha Subramaniam, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 16/574,357

(22) Filed: Sep. 18, 2019

(65) Prior Publication Data

US 2021/0084048 A1 Mar. 18, 2021

(51) Int. Cl.
*H04L 29/06* (2006.01)
*G06N 20/00* (2019.01)

(52) U.S. Cl.
CPC .......... *H04L 63/104* (2013.01); *G06N 20/00* (2019.01); *H04L 63/20* (2013.01)

(58) Field of Classification Search
CPC ..... H04L 63/104; H04L 63/20; H04L 63/101; H04L 63/105; H04L 63/1408; H04L 63/1433
USPC .......................................................... 726/1
See application file for complete search history.

(56) References Cited

U.S. PATENT DOCUMENTS

| | | | |
|---|---|---|---|
| 8,381,306 B2 | 2/2013 | McPherson et al. | |
| 8,813,225 B1 | 8/2014 | Fuller et al. | |
| 10,032,039 B1 * | 7/2018 | Milman | G06F 21/6218 |
| 10,122,757 B1 | 11/2018 | Kruse et al. | |
| 10,362,092 B1 * | 7/2019 | Parthasarathy | H04L 67/28 |
| 2009/0254392 A1 * | 10/2009 | Zander | H04L 63/20 |
| | | | 705/50 |
| 2017/0295181 A1 | 10/2017 | Parimi et al. | |

* cited by examiner

*Primary Examiner* — Longbit Chai
(74) *Attorney, Agent, or Firm* — Yee & Associates, P.C.

(57) ABSTRACT

Dynamically enforcing access control policies unique to respective users in a multi-cluster container orchestration environment is provided. Resource-permission-role mappings are generated for users in the multi-cluster container orchestration environment based on preset access control criteria. Dynamic access control criteria are learned from the multi-cluster container orchestration environment over time. The resource-permission-role mappings for the users in the multi-cluster container orchestration environment are updated based on the dynamic access control criteria learned from the multi-cluster container orchestration environment over time. The resource-permission-role mappings are enforced to respective users in the multi-cluster container orchestration environment in response to receiving corresponding user resource access requests.

20 Claims, 9 Drawing Sheets

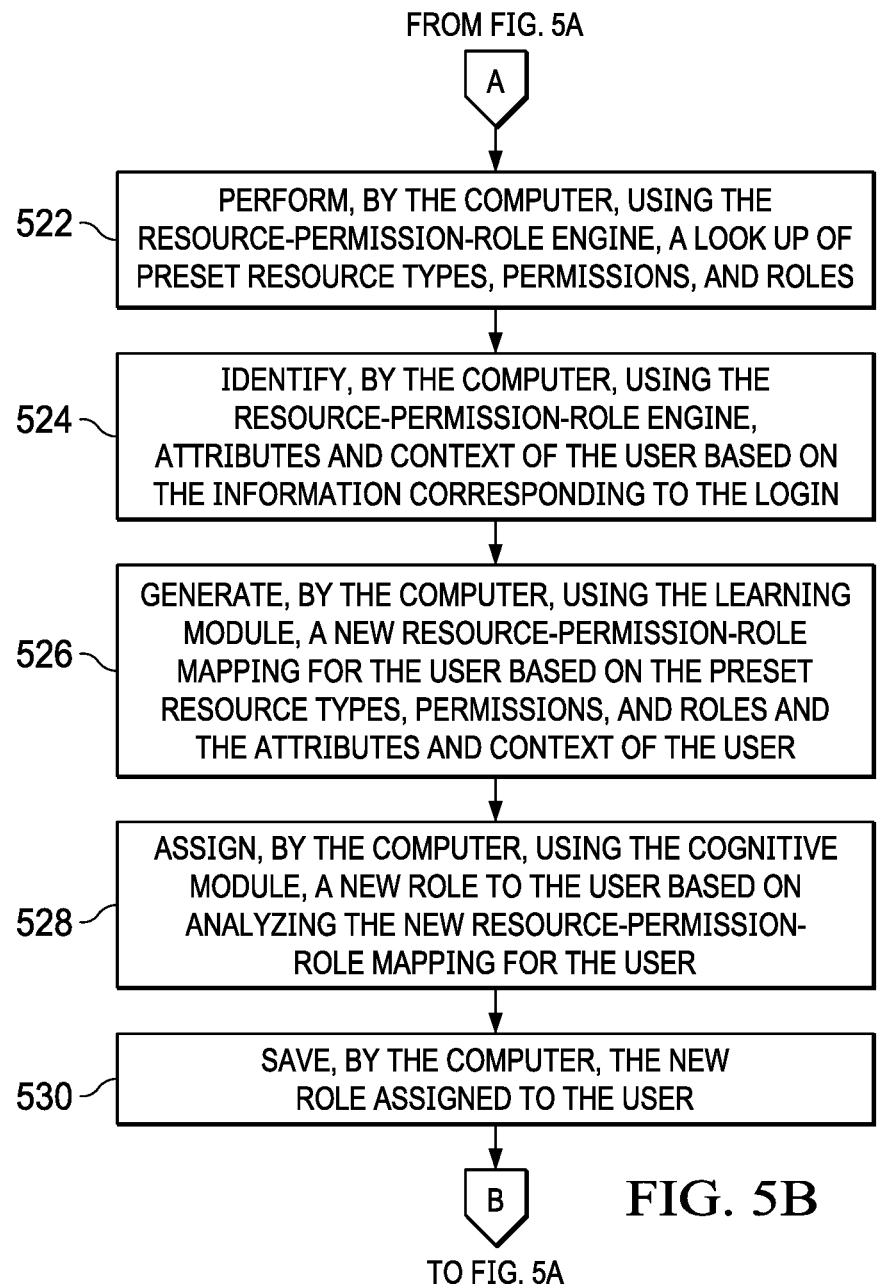

COGNITIVE ACCESS CONTROL POLICY MANAGEMENT IN A MULTI-CLUSTER CONTAINER ORCHESTRATION ENVIRONMENT

BACKGROUND

1. Field

The disclosure relates generally to multi-cluster container orchestration environments and more specifically to controlling access to resources of a multi-cluster container orchestration environment by using an access control policy comprised of resource-permission-role mappings unique to each respective user in the multi-cluster container orchestration environment.

2. Description of the Related Art

A multi-cluster container orchestration environment, such as, for example, Kubernetes, is a system for automatically deploying, scaling, and managing containerized applications across clusters of nodes. The multi-cluster container orchestration environment groups containers, which make up an application, into logical units for easier management and discovery. A group of containers is known as a cluster. One of the containers of the cluster is designated as a master node, which runs control plane processes of the multi-cluster container orchestration environment. The other containers of the cluster are assigned as worker nodes that fall under the control of the master node. The multi-cluster container orchestration environment may also manage clusters of containerized applications, which can span public, private, and hybrid clouds.

Access control is a method of enhancing security of an organization's network by restricting availability of resources to endpoint devices that comply with the organization's security policy. Restricted access to the resources is achieved through user authentication and authorization control. Authentication identifies and authenticates a user to the access control system. Authorization is the process of granting or denying specific access permissions to protected resources by the access control system.

SUMMARY

According to one illustrative embodiment, a computer-implemented method for dynamically enforcing access control policies unique to respective users in a multi-cluster container orchestration environment is provided. A computer generates resource-permission-role mappings for users in the multi-cluster container orchestration environment based on preset access control criteria. The computer learns dynamic access control criteria from the multi-cluster container orchestration environment over time. The computer updates the resource-permission-role mappings for the users in the multi-cluster container orchestration environment based on the dynamic access control criteria learned from the multi-cluster container orchestration environment over time. The computer enforces the resource-permission-role mappings to respective users in the multi-cluster container orchestration environment in response to receiving corresponding user resource access requests. According to other illustrative embodiments, a computer system and computer program product for dynamically enforcing access control policies unique to respective users in a multi-cluster environment are provided.

BRIEF DESCRIPTION OF THE DRAWINGS

FIGS. 5A-5B are a flowchart illustrating a process for assigning roles to users in accordance with an illustrative embodiment;

DETAILED DESCRIPTION

Figure 1:
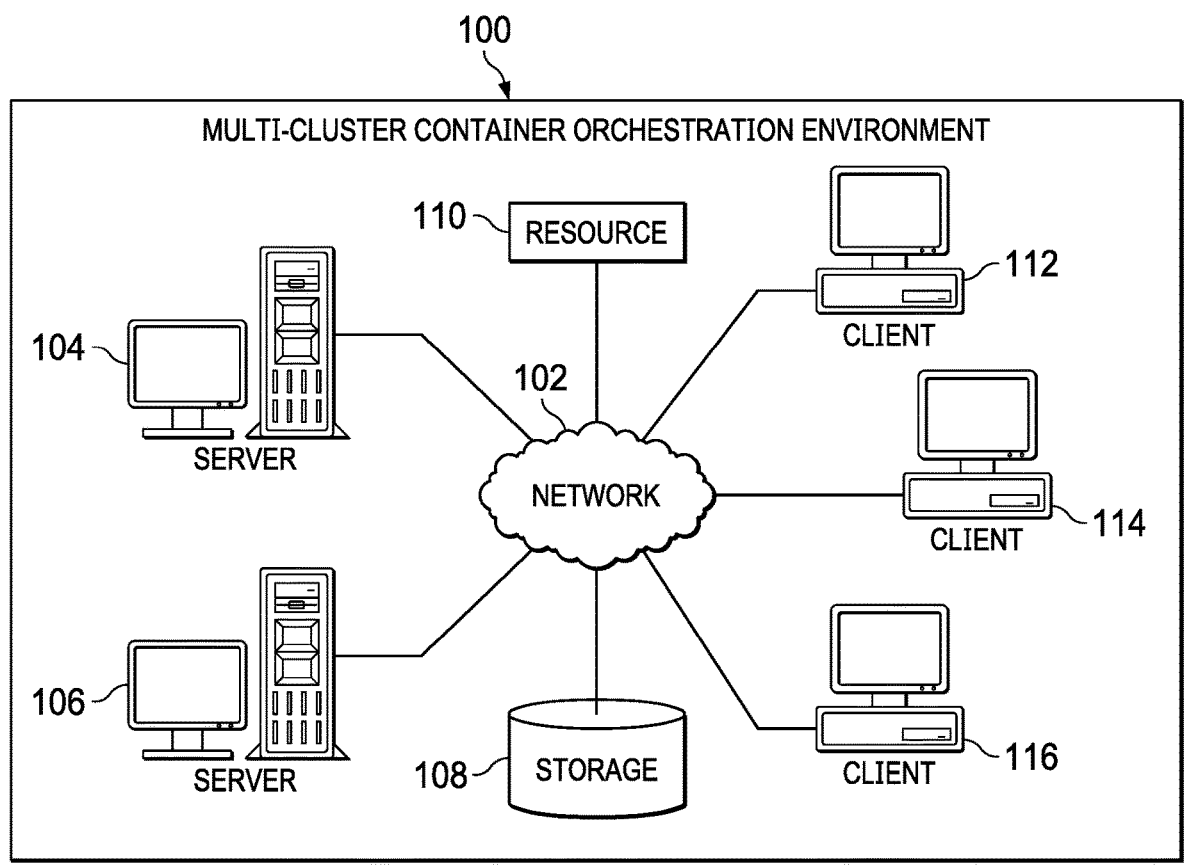
FIG. 1 is a pictorial representation of a multi-cluster container orchestration environment in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
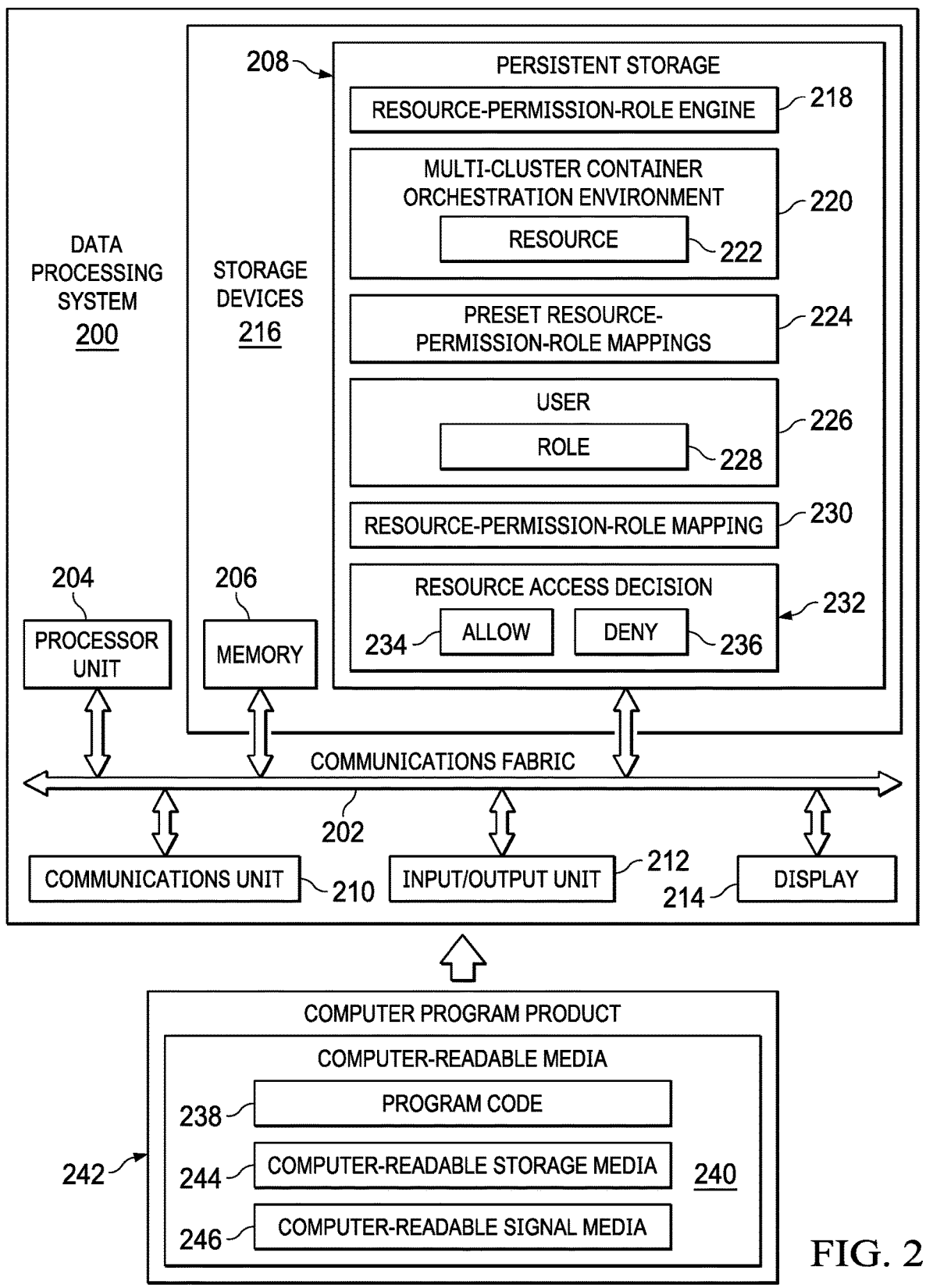
FIG. 2 is a diagram of a data processing system in which illustrative embodiments may be implemented.
Figure 3:
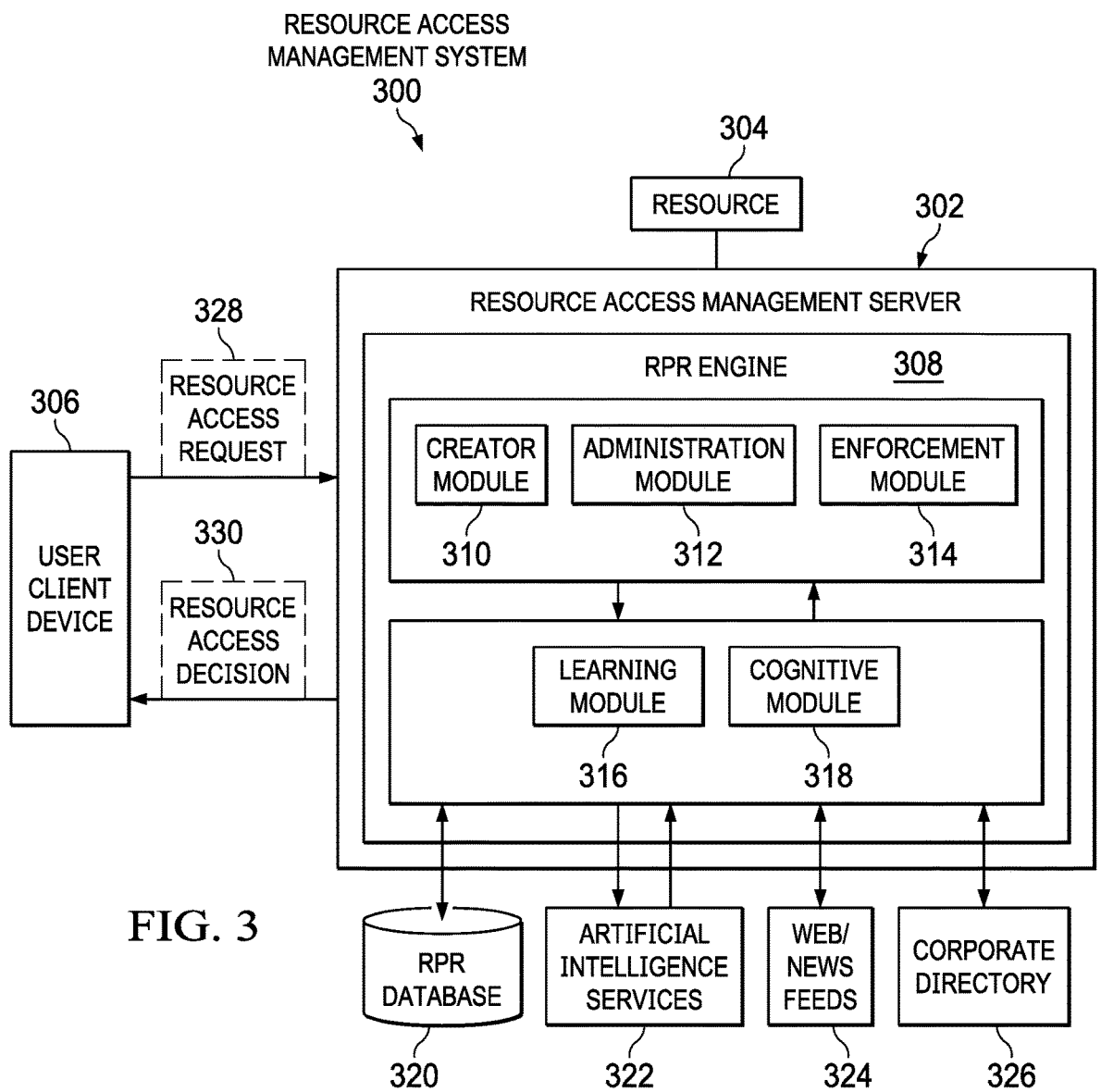
FIG. 3 is a diagram illustrating a resource access management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a multi-cluster container orchestration environment in which illustrative embodiments may be implemented. Multi-cluster container orchestration environment 100 is a network of computers, data processing systems, and other devices in which the illustrative embodiments may be implemented. Multi-cluster container orchestration environment 100 may be contained within a particular business domain or organization. Multi-cluster container orchestration environment 100 contains network 102, which is the medium used to provide communications links between the computers, data processing systems, and other devices connected together within multi-cluster container orchestration environment 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 control access to resource 110 by users of client devices. Resource 110 represents a set of one or more protected resources corresponding to the business domain or organization. A protected resource requires user authentication and authorization prior to access. Resource 110 may be, for example, a document, a set of data, a database, a storage device, a secure memory, a processor, a computer, a network, a network device, an application, or the like. Also, it should be noted that server 104 and server 106 may each represent multiple computing nodes in one or more cloud environments. Alternatively, server 104 and server 106 may each represent multiple servers in one or more data centers.

Client 112, client 114, and client 116 also connect to network 102. Clients 112, 114, and 116 are clients of server 104 and server 106. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart watches, smart televisions, and the like. Users of clients 112, 114, and 116 may utilize clients 112, 114, and 116 to, for example, perform job duties and access resource 110, which is protected by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different users, user profiles, job roles, job permissions, resource identifiers, and the like. Furthermore, storage 108 may store other types of data, such as authentication or credential data that may include user names, passwords, and biometric data associated with system administrators and users, for example.

In addition, it should be noted that multi-cluster container orchestration environment 100 may include any number of additional servers, clients, storage devices, and other devices not shown. Program code located in multi-cluster container orchestration environment 100 may be stored on a computer readable storage medium and downloaded to a computer or other data processing device for use. For example, program code may be stored on a computer readable storage medium on server 104 and downloaded to client 112 over network 102 for use on client 112.

In the depicted example, multi-cluster container orchestration environment 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. Data processing system 200 contains or controls a set of one or more unused resources that are available for use by other resource provider data processing systems. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores resource-permission-role engine 218. However, it should be noted that even though resource-permission-role engine 218 is illustrated as residing in persistent storage 208, in an alternative illustrative embodiment resource-permission-role engine 218 may be a separate component of data processing system 200. For example, resource-permission-role engine 218 may be a hardware component coupled to communication fabric 202 or a combination of hardware and software components.

Resource-permission-role engine 218 controls access to resource 222 of multi-cluster container orchestration environment 220. Resource 222 represents a set of one or more identifiers corresponding to a set of one or more protected resources, such as, for example, resource 110 in FIG. 1. Multi-cluster container orchestration environment 220 represents an identifier of a multi-cluster container orchestration environment, such as, for example, multi-cluster container orchestration environment 100 in FIG. 1.

Preset resource-permission-role mappings 224 represent a plurality of different predefined resource type, permission, and role combinations for access control policies. User 226 represents an identifier of a particular user in multi-cluster container orchestration environment 220 that is requesting access to resource 222. However, it should be noted that user 226 may represent identifiers for a plurality of different users (e.g., employees of a business domain or organization). Role 228 represents the job role assigned to user 226. Role 228 may represent any type of job role corresponding to the business domain or organization.

Resource-permission-role mapping 230 corresponds to user 226. Resource-permission-role mapping 230 represents the combination of allowed resource types and assigned permissions corresponding to role 228. Resource-permission-role engine 218 initially generates resource-permission-role mapping 230 for user 226 based on preset resource-permission-role mappings 224. However, resource-permission-role engine 218 dynamically updates resource-permission-role mapping 230 for user 226 when, for example: changes in attributes of user 226 occur, such as change in job level, change in department, change in role, and the like; changes in context of resource access requests by user 226 occur, such as change in geographic location, change in access device used, change in days or times of access requests, and the like; or changes in multi-cluster container orchestration environment 220, such as equipment failure, resource failure, network latency, and the like.

Resource-permission-role engine 218 generates resource access decision 232 based on resource-permission-role mapping 230 for user 226. Resource access decision 232 is either allow 234 or deny 236. Allow 234 allows access to resource 222. Deny 236 denies access to resource 222. If the resource, permission, role combination of resource-permission-role mapping 230 for user 226 matches the access control criteria for resource 222, then resource-permission-role engine 218 returns allow 234 for resource access decision 232 and permits user 226 to access resource 222. Conversely, if the resource, permission, role combination of resource-permission-role mapping 230 for user 226 does not match the access control criteria for resource 222, then resource-permission-role engine 218 returns deny 236 for resource access decision 232 and prevents user 226 from accessing resource 222.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Authentication refers to the process of uniquely identifying each user of a system. Authorization refers to the process of allowing or denying an individual user access to a requested resource of the system. Users may be given different authorization levels that limit their access to resources of the system.

One issue associated with users utilizing resources in a multi-cluster container orchestration environment is controlling who is provided access to, and/or control of, the resources of the system. For example, performing an assigned job or role within a set of clusters may require access to resources owned by other clusters in the multi-cluster container orchestration environment. One traditional approach is to start with a minimal set of permissions and then gradually increase permissions as and when required, which involves administrative overhead.

A zero-trust model is another traditional approach that is adopted by many organizations centered on the belief that organizations should not automatically trust anything inside or outside its perimeters and instead must verify anything and everything trying to connect to its system resources before granting access. Shortcomings of traditional approaches for authentication and authorization may include, for example, fully manual enforcement is required for authentication and authorization, roles and permissions are highly restrictive on day zero, there is an exponential increase in types of resources and action types with a hierarchy of resources, no capability exists for automatic discovery of permissions and roles, there is no dynamic creation of custom roles, cascaded permissions from top level resources can create potential security gaps, and no self-learning approaches exist that make subsequent access control operations of administrators better.

Illustrative embodiments dynamically and cognitively define an access control policy comprised of resource-permission-role mappings in a resource-permission-role markup language specific to business domain, service type, application, geography, user, and the like. Illustrative embodiments generate resource-permission-role mappings unique to each respective user in the multi-cluster container orchestration environment either from preset or predefined access control policies stored on the system or that are input by a system administrator. In addition, illustrative embodiments learn dynamic access control policies from the multi-cluster container orchestration environment over time. Illustrative embodiments automatically update the resource-permission-role mappings for the users in the multi-cluster container orchestration environment based on the dynamic access control policies learned from the multi-cluster container orchestration environment over time. Illustrative embodiments administer and enforce the resource-permission-role mappings to respective users in response to receiving corresponding user resource access requests. The resource-permission-role mappings are unique to each respective user and are unique across logins of a same user. Further, illustrative embodiments share the dynamic access control policies learned from the multi-cluster container orchestration environment over time with multiple multi-cluster environment deployments. Moreover, it should be noted that illustrative embodiments can apply the resource access control mechanism to applications to be used by these applications running on the multi-cluster container orchestration environment in addition to providing resource access control to the multi-cluster platform or node, itself.

Solutions of varying capabilities for defining access control policies currently exist today. However, using illustrative embodiments, organizations do not need to reinvent the wheel for defining and enforcing access control policies. Illustrative embodiments provide generic, yet organization-focused access control policies. Illustrative embodiments reduce the administrator's overhead in terms of assigning appropriate roles and permissions to resources and ensuring that assigned roles and permissions are current under changes in the multi-cluster container orchestration environment. In addition, illustrative embodiments provide a robust way to dynamically define, administer, and enforce access control policies. For example, illustrative embodiments continuously learn and replicate access control policy learnings across deployments. Being "environment-aware", illustrative embodiments are capable of automatically tightening resource access controls in the in a multi-cluster container orchestration environment. Currently available resource access control systems are not environment-aware.

As used herein, a managed resource is defined in a Cluster Resource Naming (CRN) format. A resource-permission-role mapping defines a role, permission, and resource combination for a user. By dynamically administering and enforcing the resource-permission-role mappings, illustrative embodiments render a unique access control policy per user, per login. Resource-permission-role mappings are specific to business domains, service types, applications, geography, and users. A business domain may be, for example, an insurance domain, a medical domain, an education domain, a financial domain, a banking domain, an entertainment domain, a manufacturing domain, a marketing domain, and the like. A service type may be any type of online service provided by the business domain. An application may be any type of application that supports functions and processes of the business domain. Geography refers to a geographic location of the multi-cluster container orchestration environment corresponding to the business domain and/or the user. User may refer to any type of user in the multi-cluster container orchestration environment and may refer to attributes of the user, such as, assigned role, assigned job level, assigned work duties, assigned work groups, assigned security level, and the like, and context of the user's resource access request, such as user's login location, day and time of the resource access request, resource requested, and the like. Thus, each user's resource-permission-role mapping becomes as unique as the user's finger print per login.

Illustrative embodiments apply cognition to each step, such as creation/setup, administration, enforcement, accumulating corpus, learning, and sharing. Illustrative embodiments perform the learning from known environments, which organizations have access to both internally and externally. For example, learnings from business accounts can be shared with on-premise deployments.

As an example workflow, on day zero, no defined resource-permission-role mappings exist. Illustrative embodiments generate first time resource-permission-role mappings based on parameters, such as, for example, existing predefined job roles, predefined permissions, predefined resource types, geography, business culture (e.g., local holidays observed), user (e.g., employee) background (i.e., identifier, job title, job level, job location, work communities user is a member of, previous experience, other interests, and the like), business domain, business policies, preauthorized access devices, and the like.

An example of a generic access control policy comprised of a resource-permission-role mapping for a user in the resource-permission-role mapping markup language is as follows:

```
<access-control-policy userid=xxx logintimestamp=hhmmssmmddyyyy>
    <access-criteria type=industry value=finance>
        <role=editor, res-crn=audit-records, permissions=edit,view />
        <role=viewer, res-crn=customer-accounts, permissions=view />
        <role=admin, res-crn=transaction, permissions=create,
        delete,edit,view />
```

```
    </access-criteria>
    <access-criteria type=geography value=AP>
        <role=editor, res-crn=xxx, permissions=edit,view />
        <role=viewer, res-crn=yyy, permissions=view />
        <role=admin, res-crn=zzz, permissions=create,
        delete,edit,view />
    </access-criteria>
    <access-criteria type=user-background value=title>
        <role=editor, res-crn=xxx, permissions=x, y, z />
        <role=viewer, res-crn=yyy, permissions=a, b/>
        <role=admin, res-crn=zzz, permissions=l, m, n />
    </access-criteria>
</access-control-policy>
```

Below is an example of a specific access control policy comprised of a resource-permission-role mapping for a user in the resource-permission-role markup language for a job promotion environment change. Creation of the access control policy for a first instance of user promotion from a job level of 6 to a job level of 7 was manually performed by an administrator. For all subsequent similar access control policy patterns, illustrative embodiments dynamically generate the access control policy for those types of users based on the prior learning.

The access control policy for the user prior to promotion is as follows:

```
<access-criteria type=user-background value=juniorlevel>
    <role=editor, res-crn=xxx, permissions=x, y, z />
    <role=viewer, res-crn=yyy, permissions=a, b/>
</access-criteria>
<access-criteria type=user-background value=department>
    <role=editor, res-crn=zzz, permissions=x, y, z />
    <role=viewer, res-crn=aaa, permissions=a, b/>
</access-criteria>
```

The access control policy for the user post promotion is as follows:

```
<access-criteria type=user-background value=seniorlevel>
    <role=editor, res-crn=xxx, permissions=x, y, z />
    <role=viewer, res-crn=yyy, permissions=a, b/>
    <role=admin, res-crn=bbb, permissions=l, m, n />
</access-criteria>
<access-criteria type=user-background value=department>
    <role=editor, res-crn=zzz, permissions=x, y, z />
    <role=viewer, res-crn=aaa, permissions=a, b/>
</access-criteria>
```

It should be noted that the bolded portions of the access control policy above indicate the job level promotion, along with the changes in role, allowed resources, and assigned permissions. Also, it should be noted that illustrative embodiments can apply the same process for a change in department for the user or the like. Illustrative embodiments do not just use one attribute of the user to make the resource access control decision, but instead utilize an entire set of user attributes and user context of resource access requests.

Thus, illustrative embodiments provide one or more technical solutions that overcome a technical problem with controlling access to resources by users in a multi-cluster container orchestration environment that changes. As a result, these one or more technical solutions provide a technical effect and practical application in the field of network resource security.

With reference now to FIG. 3, a diagram illustrating an example of a resource access management system is depicted in accordance with an illustrative embodiment. Resource access management system 300 may be implemented in a multi-cluster container orchestration environment, such as multi-cluster container orchestration environment 100 in FIG. 1. Resource access management system 300 is a system of hardware and software components for controlling access to protected resources of a multi-cluster container orchestration environment by using an access control policy comprised of resource-permission-role mappings unique to each respective user in the multi-cluster container orchestration environment.

In this example, resource access management system 300 includes resource access management server 302, resource 304, and user client device 306. However, it should be noted that resource access management system 300 is meant as an example only and not as a limitation on illustrative embodiments. In other words, resource access management system 300 may include any number of servers, resources, and user client devices.

Resource access management server 302 may be, for example, server 104 in FIG. 1 or data processing system 200 in FIG. 2. Resource access management server 302 includes resource-permission-role (RPR) engine 308, such as resource-permission-role engine 218 in FIG. 2. In this example, RPR engine 308 includes creator module 310, administration module 312, enforcement module 314, learning module 316, and cognitive module 318. However, it should be noted that RPR engine 308 may include more or fewer modules than shown. For example, a module may be divided into two or more modules, two or more modules may be combined into one module, one or more modules may be removed, one or more modules not shown may be added, and the like.

Creator module 310 dynamically generates roles from existing resource-permission-roles stored in RPR database 320. Administration module 312 can feed resource-permission-roles to an administrator to help define access control policies and resource-permission-role mappings for each access control policy. In addition, administration module 312 can cognitively assign roles to users upon login based on a respective user's attributes (e.g., job level, background, and the like). Enforcement module 314 can cognitively enforce access control policies comprised of resource-permission-role mappings to each respective user upon login. The access control policies are not static and may change upon each user login as well.

Learning module 316 and cognitive module 318 utilize information from external systems, such as RPR database 320, artificial intelligence services 322, internet/Web news feeds 324, corporate directory 326, application programming interfaces, and the like, to make informed and current resource access decisions. Cognitive learning happens as an iterative process. RPR engine 308 starts with a set of predefined rules. RPR engine 308 then uses the following capabilities to monitor changes occurring in resource access management system 300. RPR engine 308 utilizes an iterative and stateful component to "remember" previous interactions in a process and return information that is suitable for the specific application at that point in time. RPR engine 308 also utilizes a contextual component that is capable of understanding, identifying, and extracting contextual elements, such as, for example, meaning, sentiment, category of information, and relevance of the information, in making a resource access control policy decision. Artificial intelligence services exist, such as artificial intelligence services 322, which enable the above by providing services, such as, for example, natural language processing, retrieve and rank, sentiment analysis, visual recognition, and the like. RPR engine 308 utilizes these artificial intelligence services to continuously learn and add to the cognitive corpus.

RPR engine 308 accumulates the resource-permission-role mappings in a resource-permission-role mapping markup language. RPR engine 308 uses the resource-permission-role mapping markup language for learning access control criteria and resource, permission, role combinations.

At 328, user client device 306 sends a resource access request to resource access management server 302 requesting access to resource 304. Resource 304 may be, for example, resource 110 in FIG. 1. Resource access management server 302 utilizes RPR engine 308 to generate a resource access decision, such as resource access decision 232 in FIG. 2. RPR engine 308 utilizes a resource-permission-role mapping unique to the user of user client device 306 to determine whether to allow or deny access to resource 304 by the user. At 330, resource access management server 302 returns the resource access decision to user client device 306.

Figure 4:
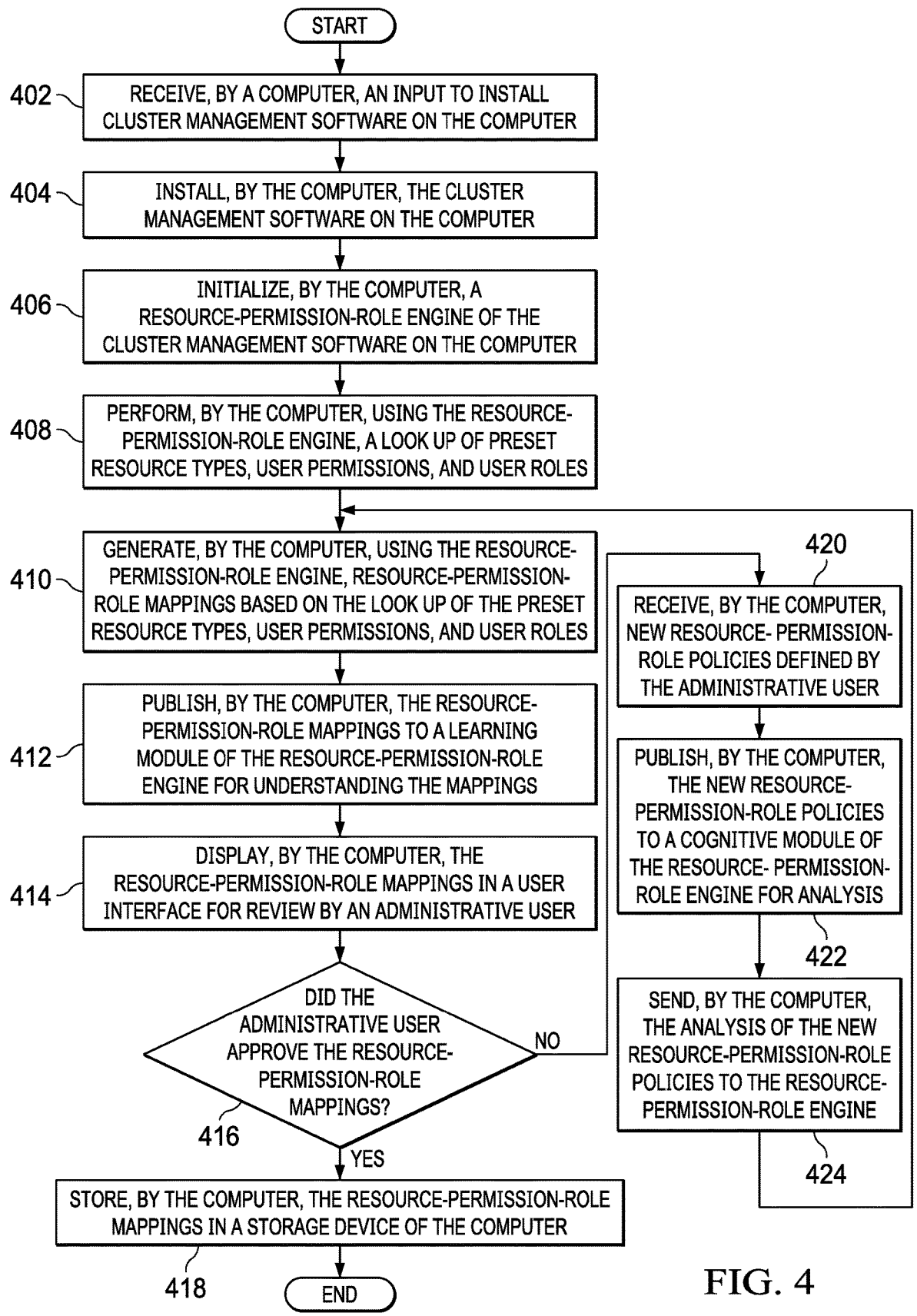
FIG. 4 is a flowchart illustrating a process for instantiating a resource-permission-role engine in accordance with an illustrative embodiment.

With reference now to FIG. 4, a flowchart illustrating a process for instantiating a resource-permission-role engine is shown in accordance with an illustrative embodiment. The process shown in FIG. 4 may be implemented in a computer, such as, for example, server 104 in FIG. 1, data processing system 200 in FIG. 2, or resource access management server 302 in FIG. 3.

The process begins when the computer receives an input to install cluster management software on the computer (step 402). Cluster management software maximizes the work that a cluster of nodes can perform. A cluster manager balances workload to reduce bottlenecks, monitors the health of elements of the cluster, and manages failover when an element fails. A cluster manager can also help a system administrator to perform administration tasks on elements in the cluster by, for example, rerouting workload off of a node that needs to be serviced. Subsequent to receiving the input to install the cluster management software in step 402, the computer installs the cluster management software on the computer (step 404).

In addition, the computer initializes a resource-permission-role engine of the cluster management software on the computer (step 406). The resource-permission-role engine may be, for example, resource-permission-role engine 218 in FIG. 2 or resource-permission-role engine 308 in FIG. 3. The computer, using the resource-permission-role engine, performs a look up of preset resource types, user permissions, and user roles (step 408).

Afterward, the computer, using the resource-permission-role engine, generates resource-permission-role mappings based on the look up of the preset resource types, user permissions, and user roles (step 410). The computer publishes the resource-permission-role mappings to a learning module of the resource-permission-role engine for understanding the mappings (step 412). Further, the computer displays the resource-permission-role mappings in a user interface for review by an administrative user (step 414).

The computer makes a determination as to whether the administrative user approved the resource-permission-role mappings (step 416). If the computer determines that the administrative user did approve the resource-permission-role mappings, yes output of step 416, then the computer stores the resource-permission-role mappings in a storage device of the computer (step 418). Thereafter, the process terminates. If the computer determines that the administrative user did not approve the resource-permission-role mappings, no output of step 416, then the computer receives new resource-permission-role policies defined by the administrative user (step 420).

The computer publishes the new resource-permission-role policies to a cognitive module of the resource-permission-role engine for analysis (step 422). The computer sends the analysis of the new resource-permission-role policies to the resource-permission-role engine (step 424). Thereafter, the process returns to step 410 where the computer updates the resource-permission-role mappings based on the analysis of the new resource-permission-role policies.

Figure 5A:
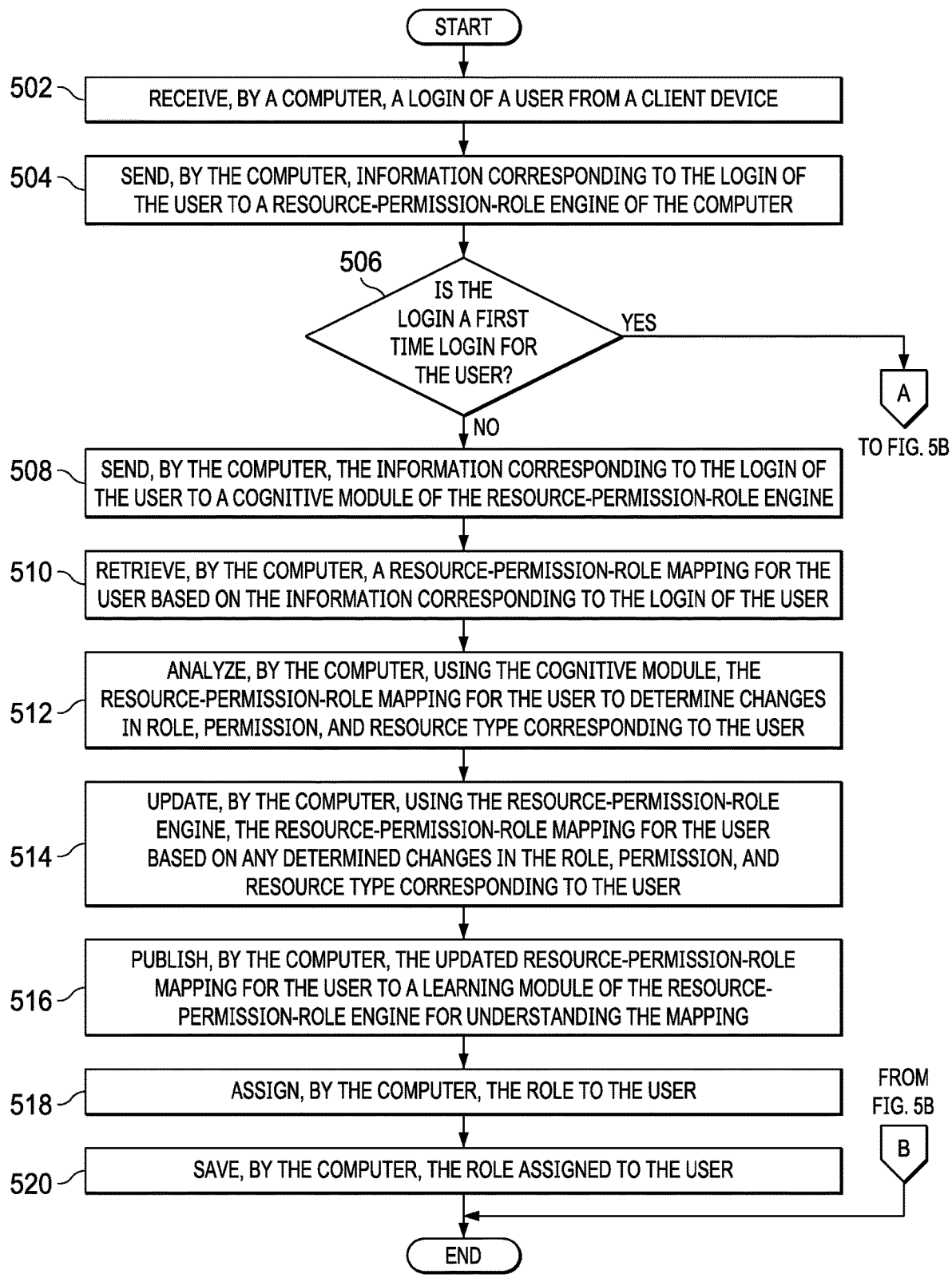

With reference now to FIGS. 5A-5B, a flowchart illustrating a process for assigning roles to users is shown in accordance with an illustrative embodiment. The process shown in FIGS. 5A-5B may be implemented in a computer, such as, for example, server 104 in FIG. 1, data processing system 200 in FIG. 2, or resource access management server 302 in FIG. 3.

The process begins when the computer receives a login of a user from a client device (step 502). The computer sends information corresponding to the login of the user to a resource-permission-role engine of the computer (step 504). The computer, using the resource-permission-role engine, makes a determination as to whether the login is a first-time login for the user (step 506).

If the computer, using the resource-permission-role engine, determines that the login is not a first-time login for the user, no output of step 506, then the computer sends the information corresponding to the login of the user to a cognitive module of the resource-permission-role engine (step 508). The computer retrieves a resource-permission-role mapping for the user based on the information corresponding to the login of the user (step 510). The computer, using the cognitive module, analyzes the resource-permission-role mapping for the user to determine changes in role, permission, and resource type corresponding to the user (step 512).

The computer, using the resource-permission-role engine, updates the resource-permission-role mapping for the user based on any determined changes in the role, permission, and resource type corresponding to the user (step 514). The computer publishes the updated resource-permission-role mapping for the user to a learning module of the resource-permission-role engine for understanding the mapping (step 516). In addition, the computer assigns the role to the user (step 518). The computer also saves the role assigned to the user (step 520). Thereafter, the process terminates.

Returning again to step 506, if the computer, using the resource-permission-role engine, determines that the login is a first time login for the user, yes output of step 506, then the computer, using the resource-permission-role engine, performs a look up of preset resource types, permissions, and roles (step 522). Further, the computer, using the resource-permission-role engine, identifies attributes and context of the user based on the information corresponding to the login (step 524). Furthermore, the computer, using the learning module, generates a new resource-permission-role mapping for the user based on the preset resource types, permissions, and roles and the attributes and context of the user (step 526).

Moreover, the computer, using the cognitive module, assigns a new role to the user based on analyzing the new resource-permission-role mapping for the user (step 528). The computer also saves the new role assigned to the user (step 530). Thereafter, the process terminates.

Figure 6A:
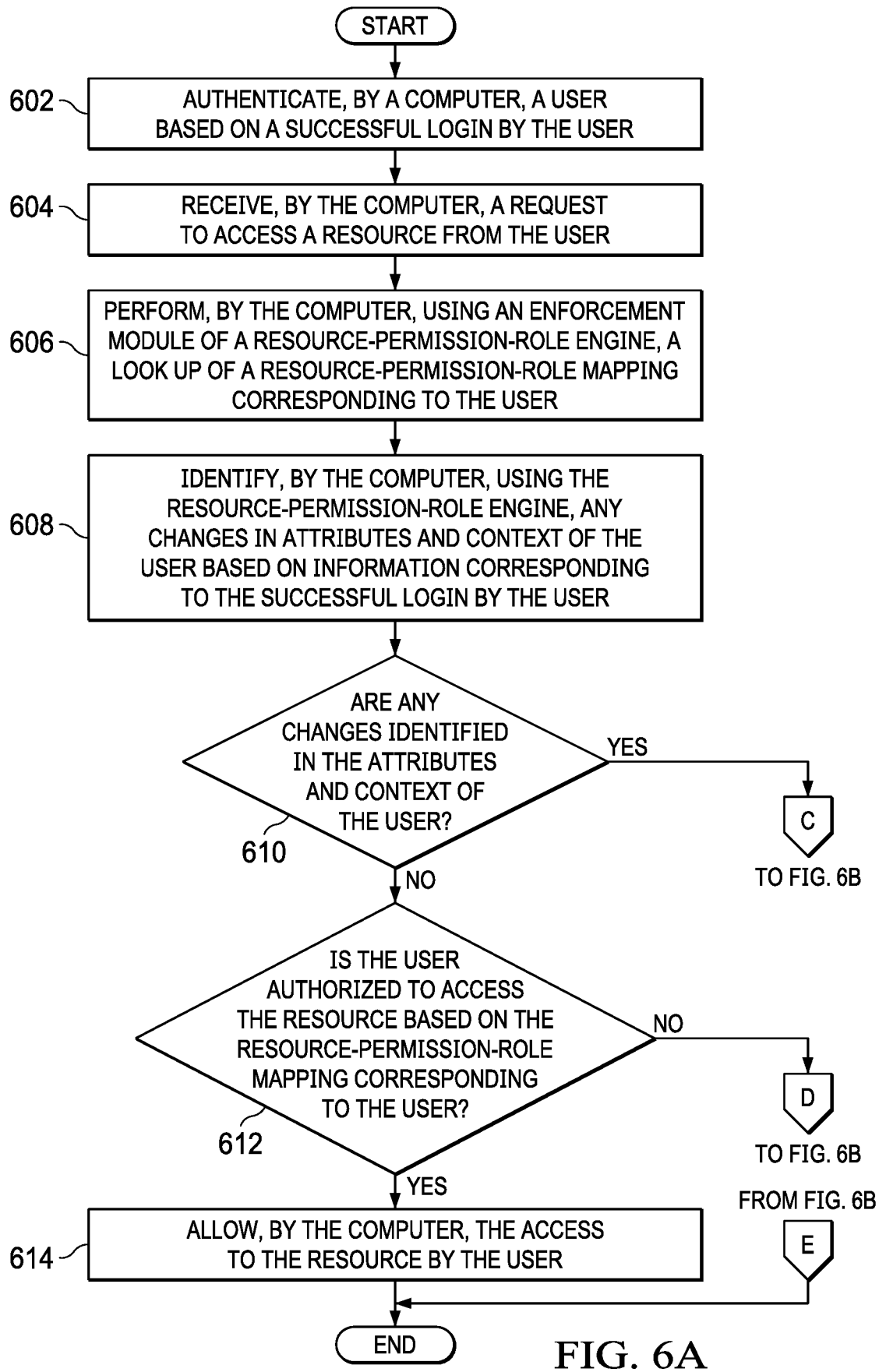
FIGS. 6A-6B are a flowchart illustrating a process for making a resource access decision in accordance with an illustrative embodiment.
Figure 6B:
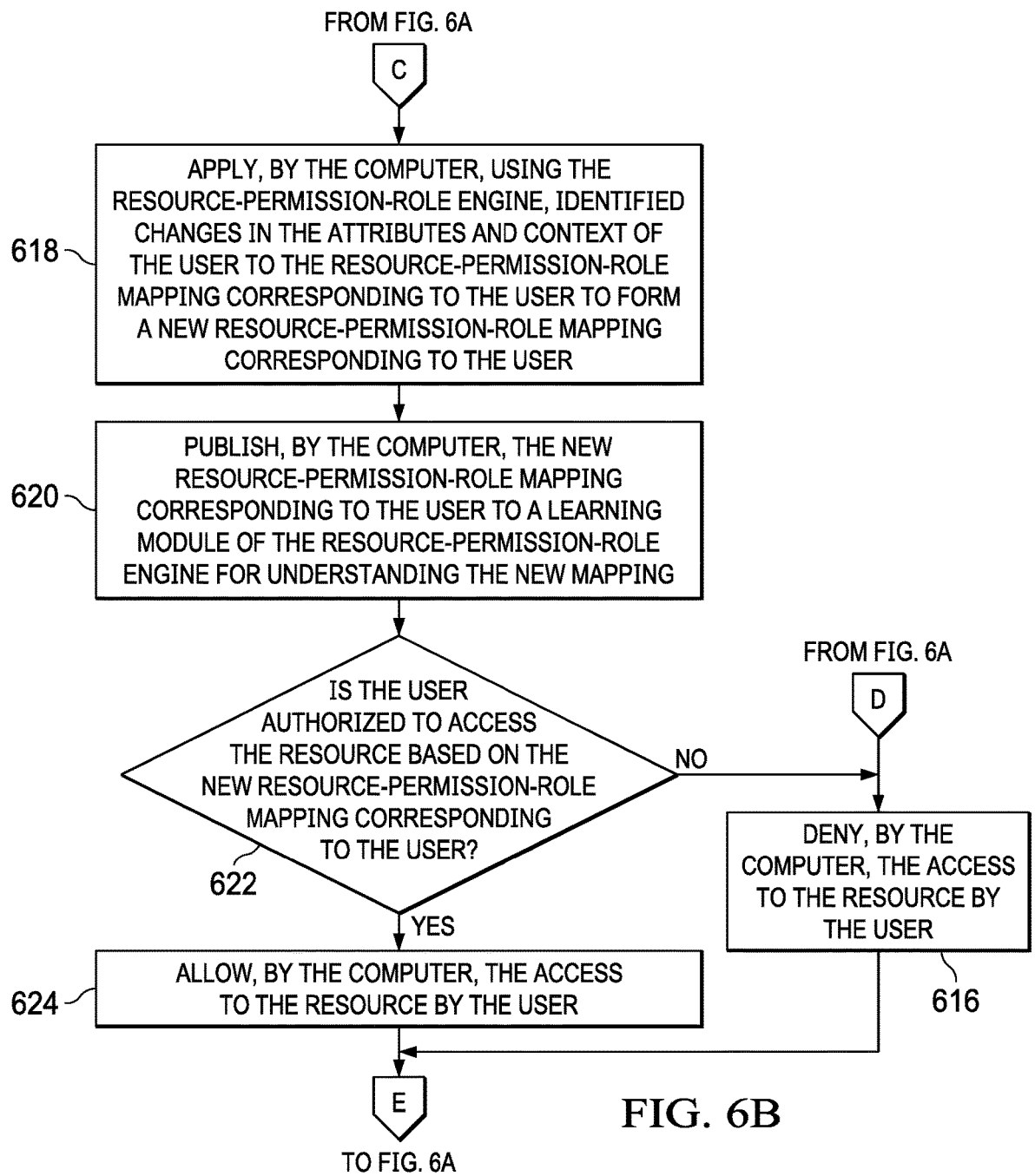

With reference now to FIGS. 6A-6B, a flowchart illustrating a process for making a resource access decision is shown in accordance with an illustrative embodiment. The process shown in FIGS. 6A-6B may be implemented in a computer, such as, for example, server 104 in FIG. 1, data processing system 200 in FIG. 2, or resource access management server 302 in FIG. 3.

The process begins when the computer authenticates a user based on a successful login by the user (step 602). Subsequently, the computer receives a request to access a resource from the user (step 604). The resource may be, for example, resource 110 in FIG. 1.

The computer, using an enforcement module of a resource-permission-role engine, performs a look up of a resource-permission-role mapping corresponding to the user (step 606). The resource-permission-role mapping corresponding to the user may be, for example, resource-permission-role mapping 230 corresponding to user 226 in FIG. 2. Further, the computer, using the resource-permission-role engine, identifies any changes in attributes and context of the user based on information corresponding to the successful login by the user (step 608).

The computer, using the resource-permission-role engine, makes a determination as to whether there are any changes identified in the attributes and context of the user (step 610). If the computer, using the resource-permission-role engine, determines that there are no changes identified in the attributes and context of the user, no output of step 610, then the computer, using the resource-permission-role engine, makes a determination as to whether the user is authorized to access the resource based on the resource-permission-role mapping corresponding to the user (step 612). If the computer, using the resource-permission-role engine, determines that the user is authorized to access the resource based on the resource-permission-role mapping corresponding to the user, yes output of step 612, then the computer allows the access to the resource by the user (step 614). Thereafter, the process terminates. If the computer, using the resource-permission-role engine, determines that the user is not authorized to access the resource based on the resource-permission-role mapping corresponding to the user, no output of step 612, then the computer denies the access to the resource by the user (step 616). Thereafter, the process terminates.

Returning again to step 610, if the computer, using the resource-permission-role engine, determines that there are changes identified in the attributes and context of the user, yes output of step 610, then the computer, using the resource-permission-role engine, applies the identified changes in the attributes and context of the user to the resource-permission-role mapping corresponding to the user to form a new resource-permission-role mapping corresponding to the user (step 618). The computer publishes the new resource-permission-role mapping corresponding to the user to a learning module of the resource-permission-role engine for understanding the new mapping (step 620).

The computer, using the resource-permission-role engine, makes a determination as to whether the user is authorized to access the resource based on the new resource-permission-role mapping corresponding to the user (step 622). If the computer, using the resource-permission-role engine, determines that the user is not authorized to access the resource based on the new resource-permission-role mapping corresponding to the user, no output of step 622, then the process returns to step 616 where the computer denies the access to the resource by the user. If the computer, using the resource-permission-role engine, determines that the user is authorized to access the resource based on the new resource-permission-role mapping corresponding to the user, yes output of step 622, then the computer allows the access to the resource by the user (step 624). Thereafter, the process terminates.

Figure 7:
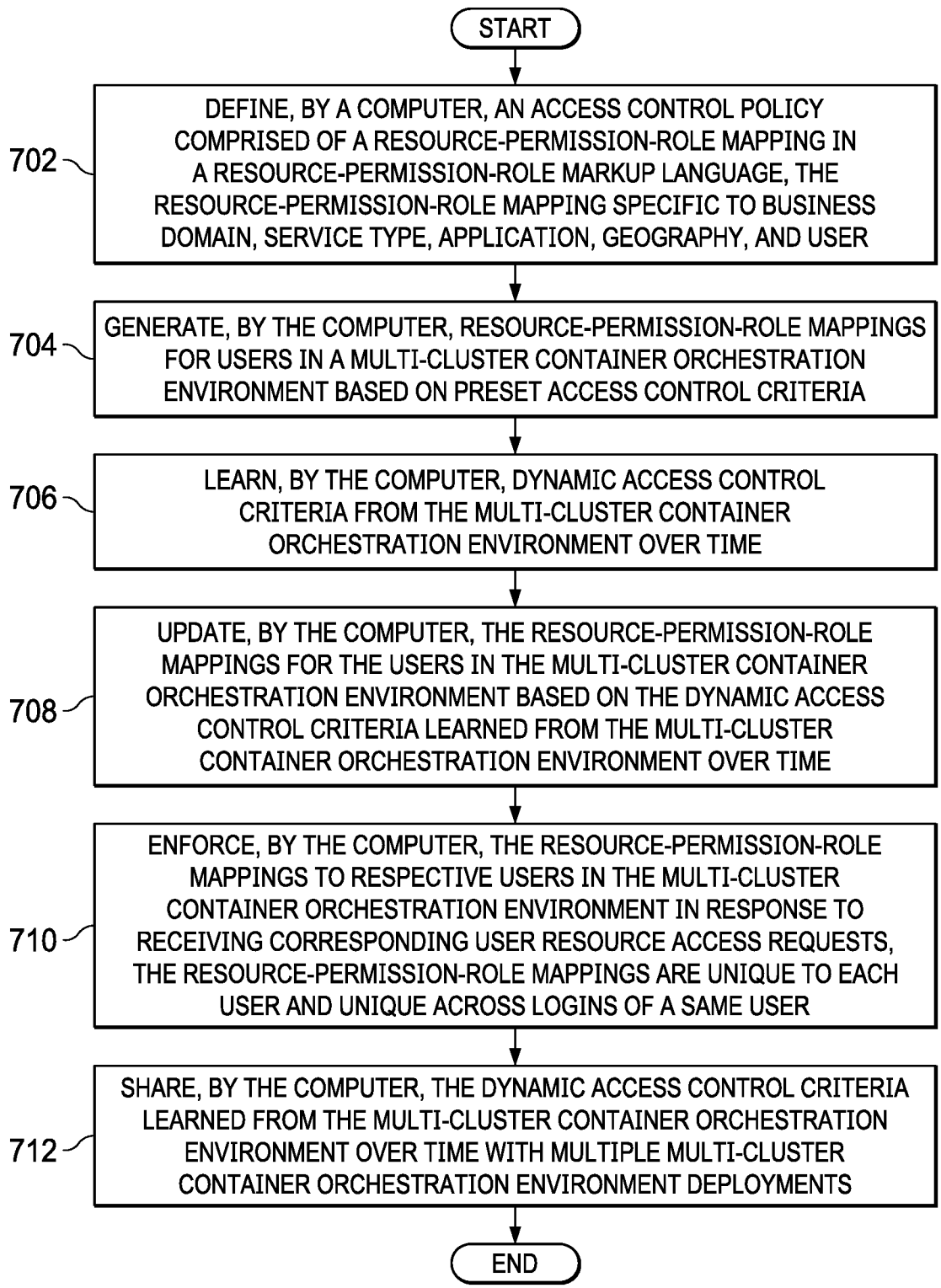
FIG. 7 is a flowchart illustrating a process for dynamically enforcing access control policies unique to respective users in a multi-cluster container orchestration environment in accordance with an illustrative embodiment.

With reference now to FIG. 7, a flowchart illustrating a process for dynamically enforcing access control policies unique to respective users in a multi-cluster container orchestration environment is shown in accordance with an illustrative embodiment. The process shown in FIG. 7 may be implemented in a computer, such as, for example, server 104 in FIG. 1, data processing system 200 in FIG. 2, or resource access management server 302 in FIG. 3.

The process begins when the computer defines an access control policy comprised of a resource-permission-role mapping in a resource-permission-role markup language (step 702). The resource-permission-role mapping is specific to business domain, service type, application, geography, and user. In addition, the computer generates resource-permission-role mappings for users in a multi-cluster container orchestration environment based on preset access control criteria (step 704). Further, the computer learns dynamic access control criteria from the multi-cluster container orchestration environment over time (step 706).

Furthermore, the computer updates the resource-permission-role mappings for the users in the multi-cluster container orchestration environment based on the dynamic access control criteria learned from the multi-cluster container orchestration environment over time (step 708). Moreover, the computer enforces the resource-permission-role mappings to respective users in the multi-cluster container orchestration environment in response to receiving corresponding user resource access requests (step 710). The resource-permission-role mappings are unique to each user and unique across logins of a same user. The computer also shares the dynamic access control criteria learned from the multi-cluster container orchestration environment over time with multiple multi-cluster container orchestration environment deployments (step 712). Thereafter, the process terminates.

Thus, illustrative embodiments of the present invention provide a computer-implemented method, computer system, and computer program product for controlling access to resources of a multi-cluster container orchestration environment by using an access control policy comprised of resource-permission-role mappings unique to each respective user in the multi-cluster container orchestration environment. Illustrative embodiments can apply this resource access control mechanism to domain specific applications running on the multi-cluster container orchestration environment, as well as on the multi-cluster node, itself. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically enforcing access control policies unique to respective users in a multi-cluster container orchestration environment, the computer-implemented method comprising:

generating, by a computer, a unique resource-permission-role mapping for each user in the multi-cluster container orchestration environment based on preset access control criteria, wherein the resource-permission-role mapping represents combination of allowed resource types and assigned permissions corresponding to each user's role;
extracting, by the computer, attributes and contextual element from resource access request created by each user upon login using an artificial intelligence service;
learning, by the computer, dynamic access control criteria from the multi-cluster container orchestration environment based on changes in the attributes and contextual element of resource access requests created by each user over time;
updating, by the computer, the resource-permission-role mappings for the users in the multi-cluster container orchestration environment based on the dynamic access control criteria learned from the multi-cluster container orchestration environment over time;
enforcing, by the computer, the resource-permission-role mappings to respective users in the multi-cluster container orchestration environment in response to receiving corresponding user resource access requests; and
generating, by the computer, an access control policy comprising resource-permission-role mappings for each user in the multi-cluster container orchestration environment.

2. The computer-implemented method of claim 1 further comprising:
defining, by the computer, the access control policy comprised of a resource-permission-role mapping in a resource-permission-role markup language.

3. The computer-implemented method of claim 2, wherein the resource-permission-role mapping is specific to business domain, service type, application, geography, and user.

4. The computer-implemented method of claim 1 further comprising:
sharing, by the computer, the dynamic access control criteria learned from the multi-cluster container orchestration environment over time with multiple multi-cluster container orchestration environment deployments.

5. The computer-implemented method of claim 1 further comprising:
receiving, by the computer, a login of a user from a client device;
determining, by the computer, whether the login is a first-time login for the user;
responsive to the computer determining that the login is not a first-time login for the user, retrieving, by the computer, a resource-permission-role mapping for the user based on information corresponding to the login of the user;
analyzing, by the computer, the resource-permission-role mapping for the user to determine changes in role, permission, and resource type corresponding to the user;
updating, by the computer, the resource-permission-role mapping for the user based on any determined changes in the role, permission, and resource type corresponding to the user; and
assigning, by the computer, the role to the user.

6. The computer-implemented method of claim 5 further comprising:

responsive to the computer determining that the login is a first-time login for the user, performing, by the computer, a look up of preset resource types, permissions, and roles;
identifying, by the computer, attributes and context of the user based on the information corresponding to the login;
generating, by the computer, a new resource-permission-role mapping for the user based on the preset resource types, permissions, and roles and the attributes and context of the user; and
assigning, by the computer, a new role to the user based on analyzing the new resource-permission-role mapping for the user.

7. The computer-implemented method of claim 1 further comprising:
receiving, by the computer, a request to access a resource from a user;
performing, by the computer, a look up of a resource-permission-role mapping corresponding to the user; and
identifying, by the computer, any changes in attributes and context of the user based on information corresponding to a successful login by the user.

8. The computer-implemented method of claim 7 further comprising:
determining, by the computer, whether there are any changes identified in the attributes and context of the user;
responsive to the computer determining that there are no changes identified in the attributes and context of the user, determining, by the computer, whether the user is authorized to access the resource based on the resource-permission-role mapping corresponding to the user;
responsive to the computer determining that the user is authorized to access the resource based on the resource-permission-role mapping corresponding to the user, allowing, by the computer, the access to the resource by the user; and
responsive to the computer determining that the user is not authorized to access the resource based on the resource-permission-role mapping corresponding to the user, denying, by the computer, the access to the resource by the user.

9. The computer-implemented method of claim 8 further comprising:
responsive to the computer determining that there are changes identified in the attributes and context of the user, applying, by the computer, identified changes in the attributes and context of the user to the resource-permission-role mapping corresponding to the user to form a new resource-permission-role mapping corresponding to the user;
determining, by the computer, whether the user is authorized to access the resource based on the new resource-permission-role mapping corresponding to the user;
responsive to the computer determining that the user is not authorized to access the resource based on the new resource-permission-role mapping corresponding to the user, denying, by the computer, the access to the resource by the user; and
responsive to the computer determining that the user is authorized to access the resource based on the new resource-permission-role mapping corresponding to the user, allowing, by the computer, the access to the resource by the user.

10. The computer-implemented method of claim 1, wherein the resource-permission-role mappings is generated based on parameters comprising at least one of existing predefined job roles, predefined permissions, predefined resource types, geography, business culture, user background, business domain, business policies, and preauthorized access devices.

11. A computer system for dynamically enforcing access control policies unique to respective users in a multi-cluster container orchestration environment, the computer system comprising:
 a bus system;
 a storage device connected to the bus system, wherein the storage device stores program instructions; and
 a hardware processor connected to the bus system, wherein the processor executes the program instructions to:
  generate a unique resource-permission-role mapping for each user in the multi-cluster container orchestration environment based on preset access control criteria, wherein the resource- permission-role mapping represents combination of allowed resource types and assigned permissions corresponding to each user's role;
  extracting, by the computer, attributes and contextual element from resource access request created by each user upon login using an artificial intelligence service;
  learn dynamic access control criteria from the multi-cluster container orchestration environment based on changes in attributes and context of resource access requests created by each user over time;
  update the resource-permission-role mappings for the users in the multi-cluster container orchestration environment based on the dynamic access control criteria learned from the multi-cluster container orchestration environment over time;
  enforce the resource-permission-role mappings to respective users in the multi-cluster container orchestration environment in response to receiving corresponding user resource access requests; and
  generating, by the computer, an access control policy comprising resource-permission-role mappings for each user in the multi-cluster container orchestration environment.

12. The computer system of claim 11, wherein the processor further executes the program instructions to:
 define an access control policy comprised of a resource-permission-role mapping in a resource-permission-role markup language.

13. The computer system of claim 12, wherein the resource-permission-role mapping is specific to business domain, service type, application, geography, and user.

14. The computer system of claim 11, wherein the processor further executes the program instructions to:
 share the dynamic access control criteria learned from the multi-cluster container orchestration environment over time with multiple multi-cluster container orchestration environment deployments.

15. The computer system of claim 11, wherein the processor further executes the program instructions to:
 receive a login of a user from a client device;
 determine whether the login is a first-time login for the user;
 retrieve a resource-permission-role mapping for the user based on information corresponding to the login of the user in response to determining that the login is not a first-time login for the user;
 analyze the resource-permission-role mapping for the user to determine changes in role, permission, and resource type corresponding to the user;
 update the resource-permission-role mapping for the user based on any determined changes in the role, permission, and resource type corresponding to the user; and
 assign the role to the user.

16. A computer program product for dynamically enforcing access control policies unique to respective users in a multi-cluster container orchestration environment, the computer program product comprising a computer readable storage medium having program instructions embodied therewith, the program instructions executable by a computer to cause the computer to perform a method comprising:
 generating, by the computer, a unique resource-permission-role mapping for each user in the multi-cluster container orchestration environment based on preset access control criteria, wherein the resource-permission-role mapping represent combination of allowed resource types and assigned permissions corresponding to the each user's roles;
 extracting, by the computer, attributes and contextual element from resource access request created by each user upon login using an artificial intelligence service;
 learning, by the computer, dynamic access control criteria from the multi-cluster container orchestration environment based on changes in attributes and context of resource access requests created by the each user over time;
 updating, by the computer, the resource-permission-role mappings for the users in the multi-cluster container orchestration environment based on the dynamic access control criteria learned from the multi-cluster container orchestration environment over time;
 enforcing, by the computer, the resource-permission-role mappings to respective users in the multi-cluster container orchestration environment in response to receiving corresponding user resource access requests; and
 generating, by the computer, an access control policy comprising resource-permission-role mappings for each user in the multi-cluster container orchestration environment.

17. The computer program product of claim 16 further comprising:
 defining, by the computer, an access control policy comprised of a resource-permission-role mapping in a resource-permission-role markup language.

18. The computer program product of claim 17, wherein the resource-permission-role mapping is specific to business domain, service type, application, geography, and user.

19. The computer program product of claim 16 further comprising:
 sharing, by the computer, the dynamic access control criteria learned from the multi-cluster container orchestration environment over time with multiple multi-cluster container orchestration environment deployments.

20. The computer program product of claim 16 further comprising:
 receiving, by the computer, a login of a user from a client device;
 determining, by the computer, whether the login is a first-time login for the user;

responsive to the computer determining that the login is not a first-time login for the user, retrieving, by the computer, a resource-permission-role mapping for the user based on information corresponding to the login of the user;

analyzing, by the computer, the resource-permission-role mapping for the user to determine changes in role, permission, and resource type corresponding to the user;

updating, by the computer, the resource-permission-role mapping for the user based on any determined changes in the role, permission, and resource type corresponding to the user; and assigning, by the computer, the role to the user.

* * * * *